US012725544B2

(12) United States Patent
Chen et al.

(10) Patent No.: US 12,725,544 B2
(45) Date of Patent: Sep. 1, 2026

(54) SCREEN DISPLAY DRIVING METHOD AND APPARATUS, SCREEN INFORMATION CONFIGURATION METHOD AND APPARATUS, MEDIUM AND DEVICE

(71) Applicant: HUIZHOU VISION NEW TECHNOLOGY CO., LTD., Huizhou (CN)

(72) Inventors: Yongquan Chen, Huizhou (CN); Lin Feng, Huizhou (CN); Lihong Ren, Huizhou (CN); Wang Tang, Huizhou (CN); Yue Zhang, Huizhou (CN)

(73) Assignee: HUIZHOU VISION NEW TECHNOLOGY CO., LTD., Huzhou (CN)

( * ) Notice: Subject to any disclaimer, the term of this patent is extended or adjusted under 35 U.S.C. 154(b) by 152 days.

(21) Appl. No.: 18/727,776

(22) PCT Filed: Nov. 11, 2022

(86) PCT No.: PCT/CN2022/131282
§ 371 (c)(1),
(2) Date: Jul. 10, 2024

(87) PCT Pub. No.: WO2023/134290
PCT Pub. Date: Jul. 20, 2023

(65) Prior Publication Data

US 2025/0095526 A1 Mar. 20, 2025

(30) Foreign Application Priority Data

Jan. 17, 2022 (CN) ......................... 202210050836.7

(51) Int. Cl.
*G09G 5/36* (2006.01)
*G06T 1/20* (2006.01)
(Continued)

(52) U.S. Cl.
CPC ............... *G09G 3/006* (2013.01); *G06T 1/20* (2013.01); *G09G 3/2092* (2013.01); *G06F 3/147* (2013.01);
(Continued)

(58) Field of Classification Search
CPC .... G06G 3/147; G06G 3/2092; G06F 13/126; G06F 13/4265; G06F 3/14; G06F 3/1407;
(Continued)

(56) References Cited

U.S. PATENT DOCUMENTS

2010/0313089 A1* 12/2010 Rajski ............ G01R 31/318547 714/E11.155
2018/0254226 A1* 9/2018 Iguchi .................. H10P 74/207
(Continued)

FOREIGN PATENT DOCUMENTS

CN 104540088 A 4/2015
CN 111369930 A 7/2020
(Continued)

OTHER PUBLICATIONS

International Search Report in International application No. PCT/CN2022/131282,mailed on Jan. 28, 2023.
(Continued)

*Primary Examiner* — Gordon G Liu
(74) *Attorney, Agent, or Firm* — PV IP PC; Wei Te Chung

(57) ABSTRACT

Provided in the embodiments of the present disclosure are a screen display driving method and apparatus, a screen information configuration method and apparatus, a medium and a device. In the embodiments of the present disclosure, configuration information of a driving IC is acquired from a display screen module installed on a device to be tested during primary screen configuration, so as to generate a target point-to-point transmission protocol required by the
(Continued)

Acquire configuration information of driving ICs from a display screen module installed on a device to be tested. — 101

Generate a target point-to-point transmission protocol required by the device to be tested based on the configuration information. — 102

Drive the screen to display based on the target point-to-point transmission protocol. — 103 device to be tested. The problems that in a research and development or production process, different software needs to be configured on a core board to match different point-to-point transmission protocols, so that the research and development or production is complex and difficult are solved.

13 Claims, 7 Drawing Sheets

(51) Int. Cl.
*G09G 3/00* (2006.01)
*G09G 3/20* (2006.01)
*G06F 3/147* (2006.01)

(52) U.S. Cl.
CPC ..... *G09G 2330/12* (2013.01); *G09G 2354/00* (2013.01); *G09G 2370/04* (2013.01); *G09G 2370/10* (2013.01)

(58) Field of Classification Search
CPC ..... G06F 9/4422; G06T 1/20; G09G 2330/12; G09G 2354/00; G09G 2370/04; G09G 2370/10; G09G 3/006
USPC .......................................................... 345/559
See application file for complete search history.

(56) References Cited

U.S. PATENT DOCUMENTS

2021/0082335 A1* 3/2021 Sun ...................... G09G 3/2096
2021/0241700 A1* 8/2021 Kwon .................. G09G 3/3275

FOREIGN PATENT DOCUMENTS

CN 111970389 A 11/2020
CN 113144594 A 7/2021

OTHER PUBLICATIONS

Written Opinion of the International Search Authority in International application No. PCT/CN2022/131282,mailed on Jan. 28, 2023.

* cited by examiner

| | |
|---|---|
| 02h | COF protocol category |
| 03h | The number of COFs |
| 04h | COF differential configuration information category |
| 05h | Length of COF protocol configuration information |
| 06~1FH<br>length changed according to setting of 05h | COF configuration register detailed information |
| 20~2BH<br>Length changed by setting of 03h | Each COF selects corresponding to configuration category |
| 2Ch-2Eh | COF dummy channel setting category |
| 30~35H<br>Length changed according to setting of 03h | Each COF sets selection corresponding to dummy |

FIG. 2

| Shift | Bit# | Description |
|---|---|---|
| 00h | 7:0 | Field identifier<br>Default bit 0x86 |
| 01h | 7:4 | Field version<br>Default is "1". |
| | 3:0 | Reserved bits, default is "0" |
| 02h | 7:4 | Reserved bits |
| | 3:0 | **COF communication protocol:**<br>0000=mini LVDS<br>0001=CSPI;<br>0010=CMPI;<br>0011=ISP;<br>0100=EPI;<br>0101=CEDS;<br>0110=CHPI;<br>0111=USIT;<br>… |
| 03h | 7:0 | **The number of OC COFs,**<br>effective range is 0~0xFF, such as 24 COFs = 0x18 |
| 04h | 7:4 | **Reserved bits, default is "0"** |
| | 3:0 | **COF setting the number of difference groups,** effective range is 0~0x0F |
| 05h | 7:0 | **Each COF group sets the required number of required bytes,** effective range is 0~0xFF |
| 06h | 7:0 | First COF group sets to Byte1 |
| 07h | 7:0 | First COF group sets to Byte2 |
| 08h | 7:0 | First COF group sets to Byte3 |
| 09h | 7:0 | First COF group sets to Byte4 |
| 0Ah | 7:0 | First COF group sets to Byte5 |
| 0Bh | 7:0 | First COF group sets to Byte6 |
| 0Ch | 7:0 | First COF group sets to Byte7 |
| 0Dh | 7:0 | First COF group sets to Byte8 |
| 0Eh | 7:0 | T First COF group sets to Byte9 |
| 0Fh | 7:0 | First COF group sets to Byte10 |
| 10h | 7:0 | First COF group sets to Byte11 |
| 11h | 7:0 | First COF group sets to Byte12 |
| 12h | 7:0 | First COF group sets to Byte13 |

FIG. 3A

| Shift | Bit# | Description |
|---|---|---|
| 13h | 7:0 | Second COF group sets to Byte1 |
| 14h | 7:0 | Second COF group sets to Byte2 |
| 15h | 7:0 | Second COF group sets to Byte3 |
| 16h | 7:0 | Second COF group sets to Byte4 |
| 17h | 7:0 | Second COF group sets to Byte5 |
| 18h | 7:0 | Second COF group sets to Byte6 |
| 19h | 7:0 | Second COF group sets to Byte7 |
| 1Ah | 7:0 | Second COF group sets to Byte8 |
| 1Bh | 7:0 | Second COF group sets to Byte9 |
| Shift | Bit# | Description |
| 1Ch | 7:0 | Second COF group sets to Byte10 |
| 1Dh | 7:0 | Second COF group sets to Byte11 |
| 1Eh | 7:0 | Second COF group sets to Byte12 |
| 1Fh | 7:0 | Second COF group sets to Byte13 |
| 20h | 7:4 | COF1 sets selection, 0=setting1, 1=setting2; effective range is 0~0x0F |
| | 3:0 | COF2 sets selection, 0=setting1, 1=setting2 |
| 21h | 7:4 | COF3 setting selection, 0=setting1, 1=setting2 |
| | 3:0 | COF4 setting selection, 0=setting1, 1=setting2 |
| 22h | 7:4 | COF5 setting selection, 0=setting1, 1=setting2 |
| | 3:0 | COF6 setting selection, 0=setting1, 1=setting2 |
| 23h | 7:4 | COF7 setting selection, 0=setting1, 1=setting2 |
| | 3:0 | COF8 setting selection, 0=setting1, 1=setting2 |
| 24h | 7:4 | COF9 setting selection, 0=setting1, 1=setting2 |
| | 3:0 | COF10 setting selection, 0=setting1, 1=setting2 |
| 25h | 7:4 | COF11 setting selection, 0=setting1, 1=setting2 |
| | 3:0 | COF12 setting selection, 0=setting1, 1=setting2 |
| 26h | 7:4 | COF13 setting selection, 0=setting1, 1=setting2 |
| | 3:0 | COF14 setting selection, 0=setting1, 1=setting2 |
| 27h | 7:4 | COF15 setting selection, 0=setting1, 1=setting2 |
| | 3:0 | COF16 setting selection, 0=setting1, 1=setting2 |
| 28h | 7:4 | COF17 setting selection, 0=setting1, 1=setting2 |
| | 3:0 | COF18 setting selection, 0=setting1, 1=setting2 |
| 29h | 7:4 | COF19 setting selection, 0=setting1, 1=setting2 |
| | 3:0 | COF20 setting selection, 0=setting1, 1=setting2 |
| 2Ah | 7:4 | COF21 setting selection, 0=setting1, 1=setting2 |
| | 3:0 | COF22 setting selection, 0=setting1, 1=setting2 |
| 2Bh | 7:4 | COF23 setting selection, 0=setting1, 1=setting2 |
| | 3:0 | COF24 setting selection, 0=setting1, 1=setting2 |

FIG. 3B

| Shift | Bit# | Description |
|---|---|---|
| 2Ch | 7:0 | COF dummy is set to 1 to scan the number of dummy channels at the start terminal |
| | 7:0 | COF dummy is set to 1 to scan the number of dummy channels at the end terminal |
| 2Dh | 7:0 | COF dummy is set to 2 to scan the number of dummy channels at the start terminal |
| | 7:0 | COF dummy is set to 2 to scan the number of dummy channels at the end terminal |
| 2Eh | 7:0 | COF dummy is set to 3 to scan the number of dummy channels at the start terminal |
| | 7:0 | COF dummy is set to 3 to scan the number of dummy channels at the end terminal |
| 30h | 7:6 | COF1 COF dummy sets selection, 1=setting1, 2=setting2; effective range is 1~0x3 |
| | 5:4 | COF2 COF dummy sets selection, 1=setting1, 2=setting2; |
| | 3:2 | COF3 COF dummy sets selection, 1=setting1, 2=setting2; |
| | 1:0 | COF4 COF dummy sets selection, 1=setting1, 2=setting2; |
| 31h | 7:6 | COF5 COF dummy sets selection, 1=setting1, 2=setting2; |
| | 5:4 | COF6 COF dummy sets selection, 1=setting1, 2=setting2; |
| | 3:2 | COF7 COF dummy sets selection, 1=setting1, 2=setting2; |
| | 1:0 | COF8 COF dummy sets selection, 1=setting1, 2=setting2; |
| 32h | 7:6 | COF9 COF dummy sets selection, 1=setting1, 2=setting2; |
| | 5:4 | COF10 COF dummy sets selection, 1=setting1, 2=setting2; |
| | 3:2 | COF11 COF dummy sets selection, 1=setting1, 2=setting2; |
| | 1:0 | COF12 COF dummy sets selection, 1=setting1, 2=setting2; |
| 33h | 7:6 | COF13 COF dummy sets selection, 1=setting1, 2=setting2; |
| | 5:4 | COF14 COF dummy sets selection, 1=setting1, 2=setting2; |
| | 3:2 | COF15 COF dummy sets selection, 1=setting1, 2=setting2; |
| | 1:0 | COF16 COF dummy sets selection, 1=setting1, 2=setting2; |
| 34h | 7:6 | COF17 COF dummy sets selection, 1=setting1, 2=setting2; |
| | 5:4 | COF18 COF dummy sets selection, 1=setting1, 2=setting2; |
| | 3:2 | COF19 COF dummy sets selection, 1=setting1, 2=setting2; |
| | 1:0 | COF20 COF dummy sets selection, 1=setting1, 2=setting2; |
| 35h | 7:6 | COF21 COF dummy sets selection, 1=setting1, 2=setting2; |
| | 5:4 | COF22 COF dummy sets selection, 1=setting1, 2=setting2; |
| | 3:2 | COF23 COF dummy sets selection, 1=setting 1, 2=setting 2; |
| | 1:0 | COF24 COF dummy sets selection, 1=setting1, 2=setting2; |

FIG. 3C

SCREEN DISPLAY DRIVING METHOD AND APPARATUS, SCREEN INFORMATION CONFIGURATION METHOD AND APPARATUS, MEDIUM AND DEVICE

This application is a US national phase application based upon an International Application No. PCT/CN2022/131282, filed on Nov. 11, 2022, which claims priority to Chinese Application No. 202210050836.7, entitled "SCREEN DISPLAY DRIVING METHOD AND APPARATUS, SCREEN INFORMATION CONFIGURATION METHOD AND APPARATUS, MEDIUM AND DEVICE", filed on Jan. 17, 2022. The entire disclosures of the above applications are incorporated herein by reference.

FIELD OF THE INVENTION

The present disclosure relates to the technical field of display screens, in particular to screen display driving, a screen information configuration method, an apparatus, a medium and a device.

BACKGROUND

With the development of the display industry, display screens are becoming increasingly larger in size, higher in resolution and higher in refresh rates. High resolution and high refresh rate require an increase in a point-to-point transmission rate. Thus, different panel manufacturers have formulated their own point-to-point transmission protocols.

For TV or monitor manufacturers, because the point-to-point transmission protocol has been set up before the first screen configuration, in the research and development/production process, different software needs to be configured on the machine core boards for different models of display screens to match different point-to-point transmission protocols, which will increase the complexity and difficulty of research and development or production.

Therefore, the existing technology has defects and needs to be improved and developed.

SUMMARY

Technical Problem

There are technical problems in the existing technology that increase the complexity and difficulty of research and development or production.

Solution to Technical Problem

Technical Solution

The embodiment of the present disclosure provides screen display driving, a screen information configuration method, an apparatus, a medium and a device, which can reduce the complexity and difficulty of research and development or production.

An embodiment of the present disclosure provides a screen display driving method, and the method comprises:

acquiring configuration information of driving ICs from a display screen module installed on a device to be tested;

generating a target point-to-point transmission protocol required for the device to be tested based on the configuration information;

driving the screen to display based on the target point-to-point transmission protocol.

According to the screen display driving method, the configuration information comprises a point-to-point transmission protocol category, and generating a target point-to-point transmission protocol based on the configuration information comprises:

determining a category of the target point-to-point transmission protocol corresponding to the screen based on the point-to-point transmission protocol category;

generating the target point-to-point transmission protocol based on the category of the target point-to-point transmission protocol.

According to the screen display driving method, the configuration information comprises the number of driving ICs in the display screen module, and generating a target point-to-point transmission protocol based on the configuration information comprises:

determining a communication interface between the display screen module and the device to be tested based on the number of driving ICs;

generating the target point-to-point transmission protocol based on the determined communication interface.

According to the screen display driving method, the configuration information comprises register configuration information of the point-to-point transmission protocol, and generating a target point-to-point transmission protocol based on the configuration information comprises:

based on the register configuration information of the point-to-point transmission protocol, determining registers corresponding to the respective driving ICs when the target point-to-point transmission protocol is configured;

generating the target point-to-point transmission protocol based on the determined registers.

According to the screen display driving method, the register configuration information comprises a length of the configuration information of the point-to-point transmission protocol and a correspondence between the driving ICs and a register category, and based on the register configuration information of the point-to-point transmission protocol, determining registers corresponding to the respective driving ICs when the target point-to-point transmission protocol is configured comprising:

based on the length of the configuration information of the point-to-point transmission protocol, determining register category required to configure the target point-to-point transmission protocol;

based on the correspondence between the driving ICs and the register category, determining the registers corresponding to the respective driving ICs.

According to the screen display driving method, the register configuration information comprises a differential configuration information category of the point-to-point transmission protocol and a correspondence between the driving ICs and register contents, and based on the register configuration information of the point-to-point transmission protocol, determining registers corresponding to the respective driving ICs when the target point-to-point transmission protocol is configured comprises:

based on the differential configuration information category of the point-to-point transmission protocol, determining the register contents required to configure the target point-to-point transmission protocol;

based on the correspondence between the driving ICs and the register contents, determining the registers corresponding to the respective driving ICs.

According to the screen display driving method, the configuration information comprises a dummy channel setting category of the driving ICs, and generating a target point-to-point transmission protocol required for the device to be tested based on the configuration information comprises:

determining the number of dummies corresponding to the driving ICs based on a dummy channel category of the driving ICs;

generating the target point-to-point transmission protocol based on the determined number of dummies.

According to the screen display driving method, after generating a target point-to-point transmission protocol, the screen display driving method further comprises:

storing the target point-to-point transmission protocol and the configuration information corresponding to the target point-to-point transmission protocol in a system-on-chip of the device to be tested.

According to the screen display driving method, before acquiring configuration information of driving ICs from a display screen module installed on a device to be tested, the screen display driving method further comprises:

detecting whether the device to be tested is in a primary screen configuration;

if so, continuing the step of acquiring configuration information of driving ICs from a display screen module installed on a device to be tested;

if not, not performing the step of acquiring configuration information of driving ICs from a display screen module installed on a device to be tested, and directly calling the target point-to-point transmission protocol stored in a system-on-chip of the device to be tested to drive the screen to display.

According to the screen display driving method, the method comprises:

in a production stage of the display screen module, when it is detected that a user inputs a point-to-point transmission protocol configuration information to the display screen module, storing the point-to-point transmission protocol configuration information input by the user in a storage unit in the display screen module.

According to the screen information configuration method, the configuration information comprises a point-to-point transmission protocol category.

According to the screen information configuration method, the configuration information comprises information about the number of driving ICs in the display screen module.

According to the screen information configuration method, the point-to-point transmission protocol configuration information comprises register configuration information of the point-to-point transmission protocol.

According to the screen information configuration method, the register configuration information comprises a length of the configuration information of the point-to-point transmission protocol and a correspondence between the driving ICs and a register category.

According to the screen information configuration method, the register configuration information comprises a differential configuration information category of the point-to-point transmission protocol and a correspondence between the driving ICs and the register contents.

According to the screen information configuration method, the configuration information comprises a dummy channel setting category of the driving ICs and a correspondence between a dummy channel category and the number of dummies.

An embodiment of the present disclosure further provides a screen display driving apparatus, and the apparatus comprises:

an acquiring module configured to acquire configuration information of driving ICs from a display screen module installed on a device to be tested;

a generating module configured to generate a target point-to-point transmission protocol required for the device to be tested based on the configuration information;

a driving module configured to drive the screen to display based on the target point-to-point transmission protocol.

An embodiment of the present disclosure further provides a computer readable storage medium storing computer program executable by a computer to perform screen display driving method or a screen information configuration method as described in any of the above embodiments.

An embodiment of the present disclosure further provides an electronic device. The electronic device comprises a processor and a memory. A computer program is stored in the memory. The processor is configured to perform a screen display driving method or a screen information configuration method as described in any of the above embodiments by calling the computer program stored in the memory.

Beneficial Effect of Present Disclosure

Advantageous Effect

When the screen is in a primary screen configuration, the embodiment of the present disclosure detects the configuration information of the driving ICs which is required from the display screen module installed on the device to be tested, and then generates the target point-to-point transmission protocol required by the device to be tested is generated, which prevents the problem of complexity and difficulty in research and development or production due to the need to configure different software on the machine core board to match different point-to-point transmission protocols during the research and development or production process because the target point-to-point transmission protocol is set in advance before the primary screen configuration.

BRIEF DESCRIPTION OF THE DRAWINGS

Description of the Drawings

In order to more clearly illustrate the technical solutions in the embodiments of the present disclosure, the drawings required to be used in the description of the embodiments will be briefly introduced below, and it is obvious that the drawings described below are only some embodiments of the present disclosure, and for those skilled in the art, other drawings can be obtained according to these drawings without creative labor.

Figure 1:
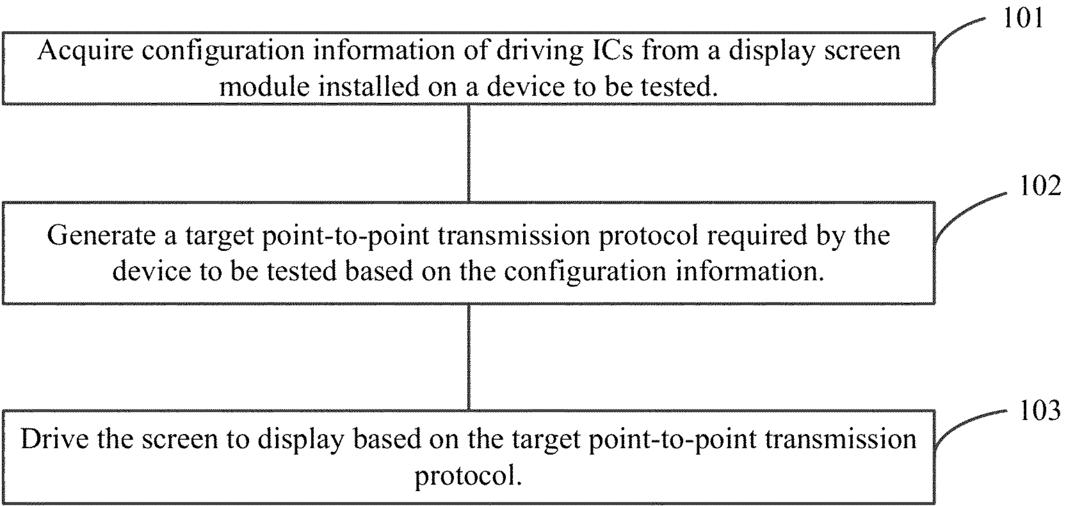

FIG. 1 is a schematic diagram of a flow of the screen display driving method of an embodiment of the present disclosure.

FIG. 2 illustrates setting of a point-to-point transmission protocol configuration information according to an embodiment of the present disclosure.

FIG. 3A, FIG. 3B and FIG. 3C illustrate settings of point-to-point transmission protocol configuration information according to another embodiment of the present disclosure.

Figure 4:
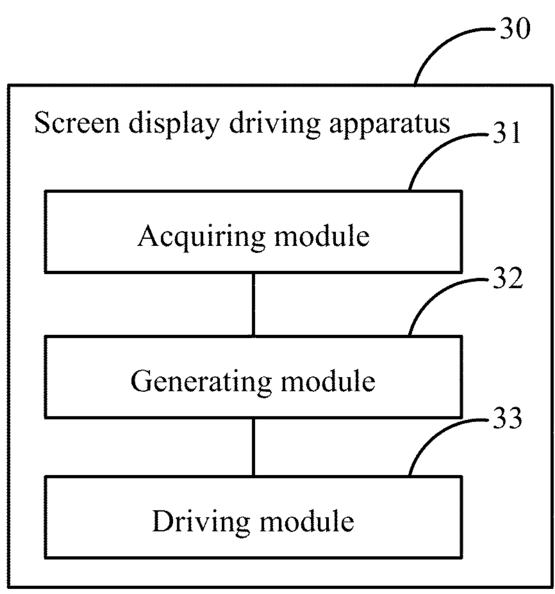

FIG. 4 is a block diagram of screen display driving apparatus according to an embodiment of the present disclosure.

Figure 5:
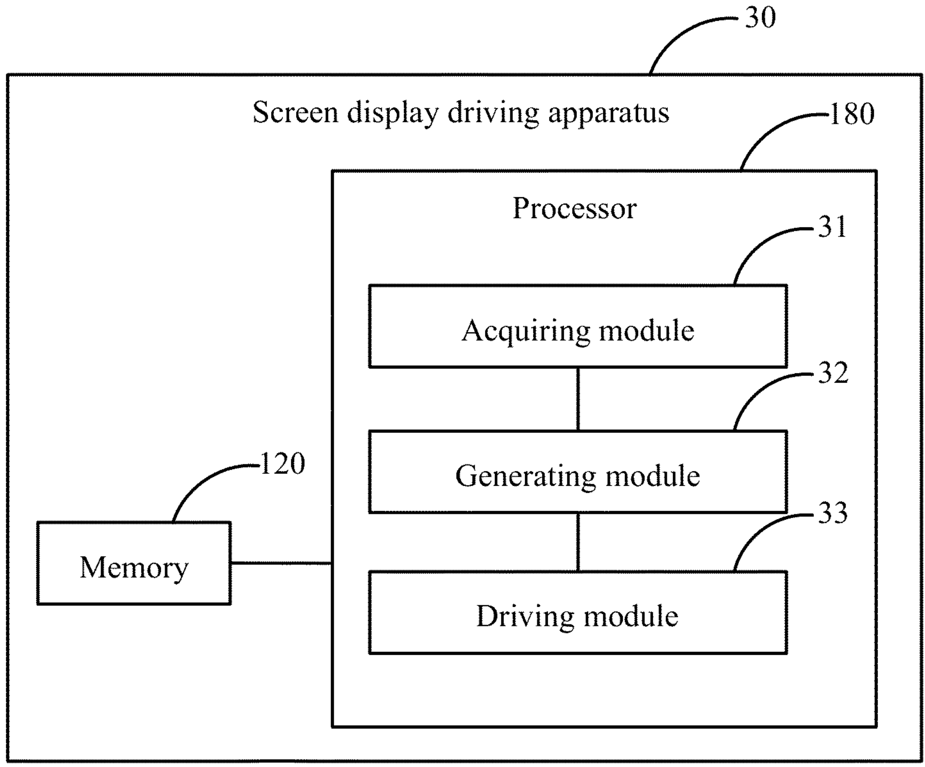

FIG. 5 is a block diagram of a screen display driving apparatus according to another embodiment of the present disclosure.

Figure 6:
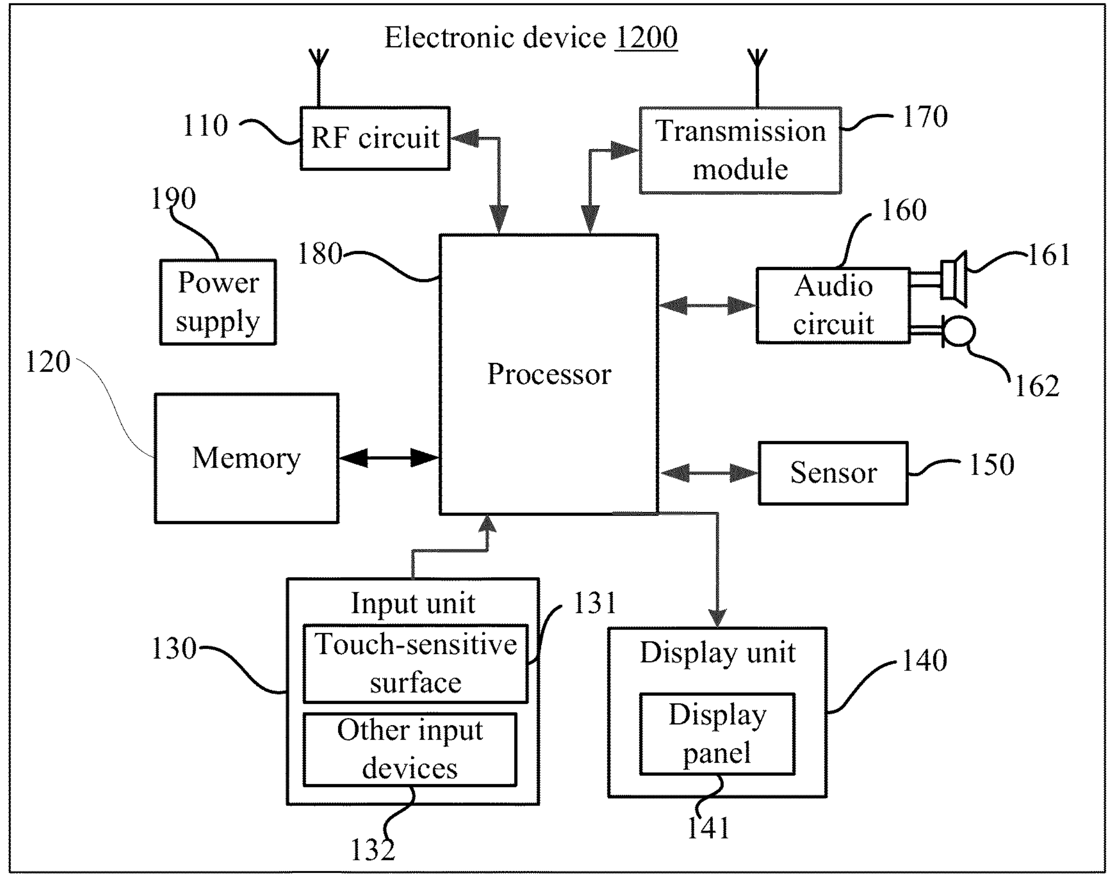

FIG. 6 is a block diagram of an electronic device according to an embodiment of the present disclosure.

EMBODIMENT OF THE PRESENT DISCLOSURE

Detailed Description of the Present Disclosure

The technical solution in the embodiment of the present disclosure will be clearly and completely described below in conjunction with the accompanying drawings in the embodiment of the present disclosure. Obviously, the described embodiments are only some embodiments of the present disclosure, not all embodiments. Based on the embodiments in the present disclosure, all other embodiments obtained by a person skilled in the art without creative labor fall within the scope of protection of the present disclosure.

The embodiment of the present disclosure provides a screen display driving method, and the screen display driving method can be applied to an electronic device. The electronic equipment may be a display device such as a television, a smart phone, a computer, a flat plate, etc.

Refer to FIG. 1, FIG. 1 is a schematic diagram of a flow of a screen display driving method of the embodiment of the present disclosure. The screen display driving method may comprise the following steps:

Step 101, acquiring configuration information of driving ICs from a display screen module installed on a device to be tested.

The device to be tested may be a device that all the parts required for the device have been installed in a device that is in the process of installation (for example, some parts, such as the back shell, are in the assembly line process and have not yet been installed, and the installation step of the back shell is performed after the display screen module is assembled in the device). In an embodiment, the device to be tested is a collection of all parts of an electronic device excluding the display screen module, that is the parts of the electronic device excluding the display screen module is referred to as the device to be tested. In another embodiment, the device to be tested may be a control board or another circuit board with a control function of an electronic device, and no specific limitation is made herein.

The display screen module can be a display screen.

In some embodiments, the configuration information of the driving ICs is required from the display screen module installed on the device to be tested only when the device to be tested is detected as being in a primary screen configuration.

The term "screen configuration" indicates that for the same screen, the device to be tested sets itself according to the parameters of the screen for the first time.

Step 102, generating a target point-to-point transmission protocol required by the device to be tested based on the configuration information.

In some embodiments, the configuration information comprises a point-to-point transmission protocol category, and generating the target point-to-point transmission protocol based on the configuration information comprises:

determining a category of the target point-to-point transmission protocol corresponding to the screen based on the point-to-point transmission protocol category;

generating the target point-to-point transmission protocol based on the category of the target point-to-point transmission protocol.

That is, according to the point-to-point transmission protocol (P2P transmission protocol) category in the configuration information, the category of the target point-to-point transmission protocol corresponding to the screen is determined, so that the required target point-to-point transmission protocol is generated based on the category of the target point-to-point transmission protocol.

In some embodiments, the configuration information comprises information about the number of driving ICs in the display screen module, and generating the target point-to-point transmission protocol based on the configuration information comprises:

determining a communication interface between the display screen module and the device to be tested based on the number of driving ICs;

generating the target point-to-point transmission protocol based on the determined communication interface.

That is, according to the number of driving ICs in the configuration information, the communication interface between the display screen module and the device to be tested is determined, and then based on the determined communication interface, the required target point-to-point transmission protocol is generated.

The communication interface is the transmission channel, and determining the communication interface between the display screen module and the device to be tested can be determining the number of transmission channels between the display screen module and the device to be tested.

In some embodiments, the configuration information comprises register configuration information of the point-to-point transmission protocol, and generating the target point-to-point transmission protocol based on the configuration information comprises:

based on the register configuration information of the point-to-point transmission protocol, determining registers corresponding to the respective driving ICs when the target point-to-point transmission protocol is configured;

generating the target point-to-point transmission protocol based on the determined registers.

That is, the configuration information comprises the register configuration information of the point-to-point transmission protocol, so that according to the register configuration information of the point-to-point transmission protocol, the registers corresponding to the respective driving ICs are determined when the target point-to-point transmission protocol is configured, and then the required target point-to-point transmission protocol is generated based on the determined registers.

The function of a register is to store a binary code, which is composed of a combination of triggers that have a storage function. A trigger can store 1-bit binary code, so a register that stores n-bit binary code needs to be composed of n triggers. According to different functions, registers can be divided into two categories: basic registers and shift registers. The base registers can only feed data in parallel and output in parallel. The data in the shift register can be shifted to the right or left in turn under shifting of pulses, and the data can be both input and output in parallel, both input and output in serial, input in parallel and output in serial, or input in serial and output in parallel, which is very flexible and has a wide range of uses.

In some embodiments, the register configuration information comprises the length of the configuration information of the point-to-point transmission protocol and a correspondence between the driving ICs and a register category. Based on the register configuration information of the point-to-point transmission protocol, determining the registers corresponding to the respective driving ICs when the target point-to-point transmission protocol is configured comprises:

based on the length of the configuration information of the point-to-point transmission protocol, determining the number of registers required to configure the target point-to-point transmission protocol;

based on the correspondence between the driving ICs and the register category, determining the registers corresponding to the respective driving ICs.

The register category comprises the number of registers.

That is, the configuration information comprises the length of the configuration information of the point-to-point transmission protocol and the correspondence between the driving ICs and the register category, so that the register category required to configure the target point-to-point transmission protocol can be determined according to the length of the configuration information of the point-to-point transmission protocol, and then the registers corresponding to the respective driving ICs are determined based on the correspondence between the driving ICs and the register category.

In some embodiments, the register configuration information comprises a differential configuration information category of the point-to-point transmission protocol and a correspondence between the driving ICs and register contents. Based on the register configuration information of the point-to-point transmission protocol, determining the registers corresponding to the respective driving ICs when the target point-to-point transmission protocol is configured comprises:

based on the differential configuration information category of the point-to-point transmission protocol, determining the register contents required to configure the target point-to-point transmission protocol;

based on the correspondence between the driving ICs and the register contents, determining the registers corresponding to the respective driving ICs.

In some embodiments, the configuration information comprises a dummy channel setting category of the driving ICs. Generating the target point-to-point transmission protocol based on the configuration information comprises:

determining the number of dummies corresponding to the driving ICs based on a dummy channel category of the driving ICs;

generating the target point-to-point transmission protocol, based on the determined number of dummies.

The dummy channel setting category: it may be different for the number of dummies of different DOF at the edge of the screen, and all dummy condition categories (up to 3) are listed here according to the start and end terminals.

Each COF (driving IC) sets selection corresponding to dummy: the dummy condition category corresponding to each COF based on the selection.

In some embodiments, after the target point-to-point transmission protocol is generated, the method further comprises:

storing the target point-to-point transmission protocol and the configuration information corresponding to the target point-to-point transmission protocol in the system-on-chip of the device to be tested.

Storing the target point-to-point transmission protocol and the configuration information corresponding to the target point-to-point transmission protocol in the system-on-chip of the device to be tested is to directly call the previous point-to-point transmission protocol as the target point-to-point transmission protocol when the device to be tested is not in the primary screen configuration, so that the required target point-to-point transmission protocol does not need to be regenerated.

Step 103, driving the screen to display based on the target point-to-point transmission protocol.

That is, after the required target point-to-point transmission protocol is obtained, the screen is driven to display through the target point-to-point transmission protocol.

In some embodiments, before the configuration information of the driving ICs is acquired from the display screen module installed on the device to be tested is acquired, the method further comprises:

detecting whether the device to be tested is in the primary screen configuration;

if so, continuing the step of acquiring the configuration information of the driving ICs from the display screen module installed on the device to be tested;

if not, not performing the step of acquiring the configuration information of the driving ICs from the display screen module installed on the device to be tested, and directly calling the target point-to-point transmission protocol stored in the system-on-chip of the device to be tested to drive the screen to display.

That is, before the configuration information of the driving ICs from the display screen module installed on the device to be tested is acquired, whether the device to be tested is in the primary screen configuration is checked. If so, the previous step of acquiring the configuration information of the driving ICs from the display screen module installed on the device to be tested is performed continuously to generate the required target point-to-point transmission protocol, thereby driving the screen to display; if not, the target point-to-point transmission protocol stored in the system-on-chip of the device to be tested is directly called to drive the screen to display, saving the time of re-acquiring the target point-to-point transmission protocol.

All the above-mentioned optional technical solutions may be arbitrarily combined to form an optional embodiment of the present disclosure, and will not be repeated herein.

In concrete implementation, the present disclosure is not limited by the order of performing the described steps, and some steps may be performed in another sequence or at the same time without conflict.

It can be seen from the above that in the screen display driving method of the embodiment of the present disclosure, when the screen is detected as being in the primary screen configuration, the configuration information of the driving ICs is acquired from the display screen module installed on the device to be tested, and then the target point-to-point transmission protocol required for the device to be tested is generated, which prevents the problem of complexity and difficulty in research and development or production due to the need to configure different software on the machine core board to match different point-to-point transmission protocols during the research and development or production process because the target point-to-point transmission protocol is set in advance before the primary screen configuration.

An embodiment of the present disclosure also provides a screen information configuration method, and as shown in FIG. 2 and FIG. 3, the method comprises:

In a production stage of a display screen module, when it is detected that the user inputs a point-to-point transmission protocol configuration information into the display screen module, the point-to-point transmission protocol configuration information input by the user is stored in a storage unit in the display screen module.

In some embodiments, the configuration information comprises a point-to-point transmission protocol category.

A COF protocol category (a point-to-point transmission protocol category): different screen factories use different communication protocols, and each protocol has a corresponding number which is stored according to the corresponding number.

In some embodiments, the configuration information comprises information about the number of driving ICs in the display screen module.

The information about the number of COFs (the information about the number of driving ICs): there is a difference in the number of COFs depending on the resolution or pixel arrangement architecture of different screens, and is stored according to the actual number.

In some embodiments, the point-to-point transmission protocol configuration information comprises register configuration information of the point-to-point transmission protocol.

In some embodiments, the register configuration information comprises the length of the configuration information of the point-to-point transmission protocol and the correspondence between the driving ICs and the register category.

The length of the COF protocol configuration information (the length of the point-to-point transmission protocol configuration information): the length of the COF configuration information that needs to be configured for different protocols is different. Taking an 8-bit register as a basis, the configuration information with the required length is stored, which is used to plan the storage space for configuring the register detailed information.

In some embodiments, the register configuration information comprises a differential configuration information category of the point-to-point transmission protocol and the correspondence between the driving ICs and the register contents.

The COF differential configuration information category (the differential configuration information category of the point-to-point transmission protocol): there may be differences in different COF configuration information for a a screen, and the number of different categories of differences is stored here.

In some embodiments, the configuration information comprises a dummy channel setting category of the driving ICs and a correspondence between a dummy channel category and the number of dummies.

The dummy channel setting type: it may be different for the number of dummies of different DOF at the edge of the screen, and all dummy condition categories (up to 3) are listed here according to the start and end terminals.

Each COF (driving IC) sets selection corresponding to dummy: the dummy condition category corresponding to each COF based on the selection.

In the process of the primary screen configuration, the SOC reads the COF configuration information from the screen storage unit, identifies the respective configuration information, and then the SOC converts the information through a specific algorithm to configure the COF communication transmission protocol.

It should be emphasized that in order to improve the boot speed, the SoC can store these parameter information in the memory on the motherboard. The next time the boot is made, SoC is only necessary to determine whether the OC model is consistent with the stored information. If they are consistent, the set of parameters stored in the SoC will be used by default to initialize the display driving, thereby complete the screen configuration. If they are not consistent, all the screen configuration information is read again, and the display driver is initialized to complete the screen configuration.

An embodiment of the present disclosure also provides a screen display driving apparatus, and the screen display driving apparatus can be integrated in an electronic device. The electronic device may be a display device such as a television.

Refer to FIG. 4, FIG. 4 is a schematic diagram of a structure of a screen display driving apparatus of an embodiment of the present disclosure. The screen display driving apparatus 30 may comprise an acquiring module 31, a generating module 32, and a driving module 33.

The acquiring module 31 is configured to acquire configuration information of driving ICs from a display screen module installed on a device to be tested;

The generating module 32 is configured to generate a target point-to-point transmission protocol required by the device to be tested based on the configuration information;

The driving module 33 is configured to drive the screen to display based on the target point-to-point transmission protocol.

In some embodiments, the generating module 32 is configured to determine a category of the target point-to-point transmission protocol corresponding to the screen based on the point-to-point transmission protocol category; generate the target point-to-point transmission protocol based on the category of the target point-to-point transmission protocol.

In some embodiments, the generating module 32 is configured to determine a communication interface between the display screen module and the device to be tested based on the number of driving ICs; generate the target point-to-point transmission protocol based on the determined communication interface.

In some embodiments, the generating module 32 is configured to determine registers corresponding to the respective driving ICs based on register configuration information of the point-to-point transmission protocol; generate the target point-to-point transmission protocol based on the determined registers.

in some embodiments, the generating module 32 is configured to determine the number of dummies corresponding to the driving ICs based on a dummy channel category of the driving ICs; generating the target point-to-point transmission protocol based on the determined number of dummies.

In specific implementation, each of the above modules can be implemented as an independent entity, or they can be arbitrarily combined and implemented as the same or several entities.

From the above, it can be seen that the screen display driving apparatus 30 of the embodiment of the present disclosure, through the acquiring module 31, acquires configuration information of driving ICs from a display screen module installed on a device to be tested; through the generating module 32, generates a target point-to-point transmission protocol required by the device to be tested based on the configuration information; through the driving module 33, drives the screen display based on the target point-to-point transmission protocol. When the screen is detected as being in the primary screen configuration, the embodiment of the present disclosure acquires the configuration information of the driving ICs from the display screen module installed on the device to be tested, and then generates the target point-to-point transmission protocol required for the device to be tested, which prevents the problem of complexity and difficulty in research and development or production due to the need to configure different software on the machine core board to match different point-to-point transmission protocols during the research and development or production process because the target point-to-point transmission protocol is set in advance before the primary screen configuration.

Referring to FIG. 5, FIG. 5 is another structural schematic diagram of a screen display driving apparatus of an embodiment of the present disclosure. The screen display driving apparatus 30 comprises a memory 120, one or more processors 180, and one or more applications, wherein the one or more applications are stored in the memory 120 and configured to be executed by the processor 180. The processor 180 may comprise an acquiring module 31, a generating module 32 and a driving module 33.

The memory 120 can be used to store applications and data. The memory 120 stores computer executable code in the application. Applications can be comprise various functional modules. The processor 180 performs various functional applications as well as data processing by running applications stored in memory 120. In addition, the memory 120 may include high-speed random access memory and may also include non-volatile memory, such as at least one disk storage device, flash memory device, or other volatile solid-state memory device. Correspondingly, the memory 120 may also include a memory controller to provide access to the memory 120 by the processor 180.

The processor 180 is the control center of the device, utilizes various interfaces and lines to connect the various parts of the whole terminal, and performs various functions and processes data of the device by running or executing the application stored in the memory 120, and calling the data stored in the memory 120, so that the device is monitored as a whole. Optionally, the processor 180 may include one or more processing cores; Preferably, the processor 180 can integrate an application processor and a modem processor, wherein the application processor mainly processes the operating system, user interface, and application applications.

The processor 180 will load executable codes corresponding to the process of one or more applications into the memory 120 according to the acquiring module 31, generating module 32 and driving module 33. The processor 180 will run the application(s) stored in the memory 120, so as to realize the screen display driving method of the embodiment of the present disclosure. The acquiring module 31, a generating module 32, a driving module 33.

The acquiring module 31 is configured to acquire configuration information of driving ICs from a display screen module installed on a device to be tested.

The generating module 32 is configured to generate a target point-to-point transmission protocol required for the device to be tested based on the configuration information.

The driving module 33 is configured to drive the screen to display based on the target point-to-point transmission protocol.

In some embodiments, the generating module 32 is used for determining a target point-to-point transmission protocol category corresponding to the screen based on the point-to-point transmission protocol category; based on the category of the target point-to-point transmission protocol, the target point-to-point transmission protocol is generated.

In some embodiments, the generating module 32 is used for determining the communication interface between the display module and the device to be tested based on the number of driver ICs; based on the determined communication interface, the target point-to-point transmission protocol is generated.

In some embodiments, the generating module 32 is used for determining the registers corresponding to each driver IC when configuring the target point-to-point transmission protocol based on the register configuration information of the point-to-point transmission protocol; Based on the determined register, the target point-to-point transmission protocol is generated.

In some embodiments, the generating module 32 is used for determining the number of dummy corresponding to the driver IC based on the dummy channel type of the driver IC; based on the determined number of dummies, the target point-to-point transmission protocol is generated.

An embodiment of the present disclosure also provides a screen information configuration apparatus, and the screen information configuration apparatus can be integrated in an electronic device. The screen information configuration apparatus comprises:

a storage module is configured to, when it is detected that the user inputs point-to-point transmission protocol configuration information into a display screen module in a production stage of the display screen module, store point-to-point transmission protocol configuration information input by the user to a storage unit in the display screen module.

Optionally, the configuration information comprises a point-to-point transfer protocol category.

Optionally, the configuration information comprises information about the number of driving ICs in the display screen module.

Optionally, the point-to-point transmission protocol configuration information comprises register configuration information of the point-to-point transmission protocol.

Optionally, the register configuration information comprises a length of the configuration information of the point-to-point transmission protocol and a correspondence between the driving ICs and a register category.

Optionally, the register configuration information comprises a differential configuration information category of the point-to-point transmission protocol and a correspondence between the driving ICs and register contents.

Optionally, the configuration information comprises a dummy channel setting category of the driving ICs and a correspondence between a dummy channel category and the number of dummies.

An embodiment of the present disclosure also provides an electronic device. Referring to FIG. 6, FIG. 6 shows a schematic diagram of a structure of an electronic device of an embodiment of the present disclosure, and the electronic device can be configured to implement the screen display driving method or the screen information configuration method provided in the above embodiments.

As shown in FIG. 6, the electronic device 1200 may comprises an RF (Radio Frequency) circuit 110, a memory 120 that comprises one or more (only one is shown in the figure) computer-readable storage mediums, an input unit 130, a display unit 140, a sensor 150, an audio circuit 160, a transmission module 170, and a processor 180 that comprises one or more (only one is shown in the figure) processing cores and a power supply 190. Those skilled in the art can understand that the structure of the electronic device 1200 shown in FIG. 4 does not constitute a limitation to the electronic device 1200. The electronic device 1200 may comprise more or less components than those illustrated in the figure, or some components may be combined, or may have different components arrangements.

The RF circuit 110 is used for receiving and transmitting electromagnetic waves, realizing the mutual conversion of electromagnetic waves and electrical signals, thereby communicating with communication networks or other equipment. The RF circuit 110 may include a variety of existing circuit elements used to perform these functions, such as antennas, RF transceivers, digital signal processors, encryption/decryption chips, user identity module (SIM) cards, memory, and so on. The RF circuit 110 can communicate with various networks such as the Internet, enterprise intranet, wireless network, or communicate with other devices through wireless networks.

The memory 120 can be used to store software programs and modules, such as the program instructions/modules corresponding to the vibration adjustment method in the above embodiment, and the processor 180 performs various functional applications and data processing by running the software programs and modules stored in the memory 120, so that it can avoid that before the first screen configuration, because the target point-to-point transmission protocol is set in advance, in the process of research and development or production, different software needs to be configured on the movement board to match different point-to-point transmission protocols, As a result, the complexity and difficulty of R&D or production are raised.

Memory 120 may include high-speed random access memory and may also include non-volatile memory such as one or more magnetic memory devices, flash memory, or other non-volatile solid-state memory. In some instances, memory 120 may further include memory that is set remotely with respect to processor 180, which can be connected to the electronic device 1200 via a network. Examples of the above networks include, but are not limited to, the Internet, intranets, local area networks, mobile communication networks, and combinations thereof.

The input unit 130 can be used for receiving input numeric or character information, and generating keyboard, mouse, joystick, optical or trackball signal input related to user settings and function control. Specifically, the input unit 130 may include a touch-sensitive surface 131 and other input devices 132. The touch-sensitive surface 131, also known as a touch-sensitive display or touchpad, collects the user's touch actions on or near it (e.g., the user's operation on or near the touch-sensitive surface 131 with any suitable object or accessory such as a finger, stylus, etc.), and drives the corresponding connection device according to a pre-programmed program. Optionally, the touch-sensitive surface 131 may comprise two parts: a touch detection device and a touch controller. Wherein, the touch detection device detects the user's touch orientation, detects the signal brought by the touch operation, and transmits the signal to the touch controller; The touch controller receives the touch information from the touch detection device, converts it into contact coordinates, and then sends it to the processor 180, and can receive the command sent by the processor 180 and executes it. In addition, touch-sensitive surfaces can be achieved in a variety of types, including resistive, capacitive, infrared, and surface acoustic waves 131. In addition to the touch-sensitive surface 131, the input unit 130 may also include other input devices 132. Specifically, other input devices 132 may include, but are not limited to, one or more of physical keyboards, function keys (such as volume control buttons, switch buttons, etc.), trackballs, mice, joysticks, etc.

The display unit 140 can be used to display information entered by the user or information provided to the user and various graphical user interfaces of the electronic device 1200, and these graphical user interfaces may be made up of graphics, text, icons, videos and any combination thereof. The display unit 140 may comprise a display panel 141, and optionally, the display panel 141 can be configured in the form of LCD (Liquid Crystal Display, liquid crystal display), OLED (Organic Light-Emitting Diode, organic light-emitting diode). Further, the touch-sensitive surface 131 can cover the display panel 141, and after the touch-sensitive surface 131 detects a touch operation on or near it, it is transmitted to the processor 180 to determine the type of touch event, and then the processor 180 provides a corresponding visual output on the display panel 141 according to the type of touch event. Although in FIG. 4, the touch-sensitive surface 131 and the display panel 141 are two independent components to realize the input and output functions, in some embodiments, the touch-sensitive surface 131 can be integrated with the display panel 141 to realize the input and output functions.

The electronic device 1200 may also include at least one sensor 150, such as a light sensor, a motion sensor, and other sensors. Specifically, the light sensor may include an ambient light sensor and a proximity sensor, wherein the ambient light sensor can adjust the brightness of the display panel 141 according to the brightness and darkness of the ambient light, and the proximity sensor can turn off the display panel 141 and/or the backlight when the electronic device 1200 moves to the ear. As a kind of motion sensor, the gravitational acceleration sensor can detect the magnitude of acceleration in all directions (generally three axes), and can detect the magnitude and direction of gravity when stationary, which can be used to identify the application of mobile phone attitude (such as horizontal and vertical screen switching, related games, magnetometer attitude calibration), vibration recognition related functions (such as pedometer, tapping). As for the gyroscope, barometer, hygrometer, thermometer, infrared sensor and other sensors that can also be configured with the electronic device 1200.

The audio circuit 160, the speaker 161, and the microphone 162 can provide an audio interface between the user and the electronic device 1200. The audio circuit 160 can transmit the electrical signal converted by the received audio data to the speaker 161, and the speaker 161 converts it into a sound signal output. On the other hand, the microphone 162 converts the collected sound signal into an electrical signal, is converted into audio data after being received by the audio circuit 160, and then the audio data output processor 180 is processed, and is sent to another terminal such as another terminal through the RF circuit 110, or the audio data is output to the memory 120 for further processing. The audio circuit 160 may also include an earbud jack to provide communication between the peripheral headset and the electronic device 1200.

The electronic device 1200 can help users send and receive e-mails, browse web pages and access streaming media through transmission modules 170 (such as Wi-Fi modules), and it provides users with wireless broadband Internet access. Although the transmission module 170 is shown in FIG. 4, it is understandable that it is not a necessary component of the electronic device 1200 and can be omitted as necessary without altering the nature of the invention.

The processor 180 is the control center of the electronic device 1200, utilizes various interfaces and lines to connect various parts of the entire mobile phone, performs various functions of the electronic device 1200 and processes data by running or executing software programs and/or modules stored in the memory 120, and calling the data stored in the memory 120, so as to carry out overall monitoring of the mobile phone. Optionally, the processor 180 may include one or more processing cores; In some embodiments, the processor 180 can integrate an application processor and a modem processor, wherein the application processor mainly processes the operating system, the user interface and the application and the like, and the modem processor mainly processes wireless communication. Understandably, the modem processor can also be left unintegrated into the processor 180.

The electronic device 1200 also comprises a power supply 190 (such as a battery) that supplies power to each component, and in some embodiments, the power supply can be logically connected with the processor 180 through a power management system, so that functions such as managing charging, discharging, and power consumption management are realized through the power management system. The power supply 190 can also include any component such as one or more DC or AC power sources, recharging systems, power fault detection circuits, power converters or inverters, power status indicators, etc.

Although not shown, the electronic device 1200 can also include cameras (such as front camera, rear camera), Bluetooth module, etc., which will not be repeated here. Specifically, in this embodiment, the display unit 140 of the electronic device 1200 is a touch-screen display, the electronic device 1200 further comprises a memory 120, and one or more programs, one or more programs are stored in the memory 120, and one or more programs are configured to be executed by one or more processors 180 and include instructions for carrying out the following operations:

acquiring configuration information of driving ICs from a display screen module installed on a device to be tested;

generating a target point-to-point transmission protocol required for the device to be tested based on the configuration information;

driving the screen to display based on the target point-to-point transmission protocol.

In some embodiments of the present disclosure, the processor 180 is used for determining a category of the target point-to-point transmission protocol corresponding to the screen based on the point-to-point transmission protocol category;

generating the target point-to-point transmission protocol based on the category of the target point-to-point transmission protocol.

In some embodiments of the present disclosure, the processor 180 is used for determining a communication interface between the display screen module and the device to be tested based on the number of driving ICs;

generating the target point-to-point transmission protocol based on the determined communication interface.

In some embodiments of the present disclosure, the processor 180 is used for based on the register configuration information of the point-to-point transmission protocol, determining registers corresponding to the respective driving ICs when the target point-to-point transmission protocol is configured;

generating the target point-to-point transmission protocol based on the determined registers.

In some embodiments of the present disclosure, the processor 180 is used for based on the length of the configuration information of the point-to-point transmission protocol, determining register category required to configure the target point-to-point transmission protocol;

based on the correspondence between the driving ICs and the register category, determining the registers corresponding to the respective driving ICs.

In some embodiments of the present disclosure, the processor 180 is used for based on the differential configuration information category of the point-to-point transmission protocol, determining the register contents required to configure the target point-to-point transmission protocol;

based on the correspondence between the driving ICs and the register contents, determining the registers corresponding to the respective driving ICs.

In some embodiments of the present disclosure, the processor 180 is used for determining the number of dummies corresponding to the driving ICs based on a dummy channel category of the driving ICs; generating the target point-to-point transmission protocol based on the determined number of dummies.

In some embodiments of the present disclosure, the processor 180 is used for storing the target point-to-point transmission protocol and the configuration information corresponding to the target point-to-point transmission protocol in a system-on-chip of the device to be tested.

In some embodiments of the present disclosure, the processor 180 is used for detecting whether the device to be tested is in a primary screen configuration;

if so, continuing the step of acquiring configuration information of driving ICs from a display screen module installed on a device to be tested;

if not, not performing the step of acquiring configuration information of driving ICs from a display screen module installed on a device to be tested, and directly calling the target point-to-point transmission protocol stored in a system-on-chip of the device to be tested to drive the screen to display.

As can be seen from the above, the embodiment of the present disclosure provides an electronic device 1200, and the electronic device 1200 performs the following steps: acquiring configuration information of driving ICs from a display screen module installed on a device to be tested; generating a target point-to-point transmission protocol required for the device to be tested based on the configuration information; driving the screen to display based on the target point-to-point transmission protocol. When the screen is detected as being in the primary screen configuration, the embodiment of the present disclosure acquires the configuration information of the driving ICs from the display screen module installed on the device to be tested, and then generates the target point-to-point transmission protocol required for the device to be tested, which prevents the problem of complexity and difficulty in research and development or production due to the need to configure different software on the machine core board to match different point-to-point transmission protocols during the research and development or production process because the target point-to-point transmission protocol is set in advance before the primary screen configuration.

An embodiment of the present disclosure further provides a storage medium. A computer program is stored in the storage medium. When the computer program is run on a computer, the computer performs a screen display driving method or a screen information configuration method as described in any of the above embodiments.

It should be noted that, for the screen display driver method of the present disclosure, ordinary testers in the art can understand that all or part of the process of realizing the screen display driving method of the embodiment of the present disclosure can be completed by controlling the relevant hardware through a computer program, and the computer program can be stored in a computer-readable storage medium, such as in the memory of an electronic device, and executed by at least one processor in the electronic device, A process that may include an embodiment of the vibration regulation method as described in the execution process. Wherein, the storage medium may be a diskette, an optical disc, a read-only memory (ROM, Read Only Memory), a random access memory (RAM), and the like.

For the screen display driving device of the embodiment of the present disclosure, each functional module thereof may be integrated in a processing chip, or each module may exist separately physically, or two or more modules may be integrated in a module. The above-mentioned integrated modules can be implemented in the form of either hardware or software function modules. When the integrated module is realized in the form of a software function module and is sold or used as an independent product, it can also be stored in a computer-readable storage medium, and the storage medium is such as a read-only memory, a disk or an optical disc.

The screen display driving method, screen information configuration method, device, medium and apparatus provided by the embodiment of the present disclosure are described in detail above. In the present disclosure, the principles and embodiments of the present disclosure are expounded by applying specific examples, and the descriptions of the above embodiments are only used to help understand the methods and core ideas of the present disclosure. At the same time, for those skilled in the art, there will be changes in the specific embodiment and scope of the present disclosure according to the idea of the present disclosure, and in summary, the contents of this specification should not be construed as a restriction on the present disclosure.

What is claimed is:

1. A screen display driving method comprising:

acquiring configuration information of driving ICs from a display screen module installed on a device to be tested, wherein the configuration information comprises register configuration information of the point-to-point transmission protocol;

based on the register configuration information of the point-to-point transmission protocol, determining registers corresponding to the respective driving ICs when a target point-to-point transmission protocol is configured;

generating the target point-to-point transmission protocol based on the determined registers; and driving the screen to display based on the target point-to-point transmission protocol.

2. The screen display driving method of claim 1, wherein the register configuration information comprises a length of the configuration information of the point-to-point transmission protocol and a correspondence between the driving ICs and a register category, and based on the register configuration information of the point-to-point transmission protocol, determining registers corresponding to the respective driving ICs when the target point-to-point transmission protocol is configured comprising:

based on the length of the configuration information of the point-to-point transmission protocol, determining register category required to configure the target point-to-point transmission protocol;

based on the correspondence between the driving ICs and the register category, determining the registers corresponding to the respective driving ICs.

3. The screen display driving method of claim 1, wherein the register configuration information comprises a differential configuration information category of the point-to-point transmission protocol and a correspondence between the driving ICs and register contents, and based on the register configuration information of the point-to-point transmission protocol, determining registers corresponding to the respective driving ICs when the target point-to-point transmission protocol is configured comprises:

based on the differential configuration information category of the point-to-point transmission protocol, determining the register contents required to configure the target point-to-point transmission protocol;

based on the correspondence between the driving ICs and the register contents, determining the registers corresponding to the respective driving ICs.

4. The screen display driving method of claim 1, wherein the configuration information comprises a dummy channel setting category of the driving ICs, and generating a target point-to-point transmission protocol required for the device to be tested based on the configuration information comprises:

determining the number of dummies corresponding to the driving ICs based on a dummy channel category of the driving ICs;

generating the target point-to-point transmission protocol based on the determined number of dummies.

5. The screen display driving method of claim 1, wherein, after generating a target point-to-point transmission protocol, the screen display driving method further comprises:

storing the target point-to-point transmission protocol and the configuration information corresponding to the target point-to-point transmission protocol in a system-on-chip of the device to be tested.

6. The screen display driver method of claim 5, wherein before acquiring configuration information of driving ICs from a display screen module installed on a device to be tested, the screen display driving method further comprises:

detecting whether the device to be tested is in a primary screen configuration;

upon a condition that the device to be tested is in a primary screen configuration, continuing the step of acquiring configuration information of driving ICs from a display screen module installed on a device to be tested;

upon a condition that the device to be tested is not in a primary screen configuration, not performing the step of acquiring configuration information of driving ICs from a display screen module installed on a device to be tested, and directly calling the target point-to-point transmission protocol stored in a system-on-chip of the device to be tested to drive the screen to display.

7. A screen information configuration method applied to a display screen module, wherein the method comprises:

in a production stage of the display screen module, when it is detected that a user inputs a point-to-point transmission protocol configuration information to the display screen module, storing the point-to-point transmission protocol configuration information input by the user in a storage unit in the display screen module, wherein the configuration information comprises a dummy channel setting category of the driving ICs and a correspondence between a dummy channel category and the number of dummies.

8. The screen information configuration method of claim 7, wherein the configuration information comprises a point-to-point transmission protocol category.

9. The screen information configuration method of claim 7, wherein the configuration information comprises information about the number of driving ICs in the display screen module.

10. The screen information configuration method of claim 7, wherein the point-to-point transmission protocol configuration information comprises register configuration information of the point-to-point transmission protocol.

11. The screen information configuration method of claim 10, wherein the register configuration information comprises a length of the configuration information of the point-to-point transmission protocol and a correspondence between the driving ICs and a register category.

12. The screen information configuration method of claim 10, wherein the register configuration information comprises a differential configuration information category of the point-to-point transmission protocol and a correspondence between the driving ICs and the register contents.

13. An electronic device comprising a processor and a memory, wherein a computer program is stored in the memory, and the processor is configured to perform operations comprising:

acquiring configuration information of driving ICs from a display screen module installed on a device to be tested, wherein the configuration information comprises register configuration information of the point-to-point transmission protocol;

based on the register configuration information of the point-to-point transmission protocol, determining registers corresponding to the respective driving ICs when a target point-to-point transmission protocol is configured;

generating the target point-to-point transmission protocol based on the determined registers; and driving the screen to display based on the target point-to-point transmission protocol.

* * * * *